United States Patent [19]

Ohorodnik et al.

[11] 3,923,917
[45] Dec. 2, 1975

[54] PRODUCTION OF MONOVINYLACETYLENE

[75] Inventors: Alexander Ohorodnik, Erftstadt Liblar; Klaus Gehrmann, Erftstadt Lechenich; Günter Legutke, Bruhl; Hermann Vierling, Hurth, all of Germany

[73] Assignee: Hoechst Aktiengesellschaft, Germany

[22] Filed: Dec. 10, 1974

[21] Appl. No.: 531,213

[30] Foreign Application Priority Data

Dec. 17, 1973 Germany............................ 2362602

[52] U.S. Cl............................. 260/678; 260/655 R
[51] Int. Cl.$^2$.................... C07C 11/22; C07C 21/20
[58] Field of Search..................................... 260/678

[56] References Cited
UNITED STATES PATENTS

| | | | |
|---|---|---|---|
| 1,926,039 | 9/1933 | Downing et al.................... | 260/678 |
| 1,926,055 | 9/1933 | Nieuwland......................... | 260/678 |
| 2,222,394 | 11/1940 | Berg et al. ......................... | 260/678 |
| 2,934,576 | 4/1960 | Goffinet, Jr........................ | 260/678 |
| 3,142,711 | 7/1964 | Bauchwitz et al. ................. | 260/678 |
| 3,806,554 | 4/1974 | Ohorodnik et al.................. | 260/678 |
| 3,843,743 | 10/1974 | Ohorodnik et al.................. | 260/678 |

Primary Examiner—Delbert E. Gantz
Assistant Examiner—Juanita M. Nelson
Attorney, Agent, or Firm—Connolly and Hutz

[57] ABSTRACT

Monovinylacetylene is produced by an improved process, wherein acetylene is introduced at temperatures within the range 40° and 100°C and under acetylene gas pressures within the range 0.01 and 10 atmospheres (gauge) into a Nieuwland catalyst type solution being an aqueous copper(I) chloride solution in hydrochloric acid, which is used in admixture with between 0.1 and 10 weight% of an alkali metal salt of an aminocarboxylic acid or of an aminosulfonic acid and in further admixture with an organic monovinylacetylene solvent boiling at temperatures higher than about 150°C, immiscible with the solution and containing at least 40 weight% of indan together with further mononuclear aromates; wherein the catalyst solution and the solvent are mechanically dispersed by introducing acetylene thereinto with the resultant formation of a homogeneous catalyst liquid having between 25 and 85% by volume of the solvent therein; wherein monovinylacetylene is continually stripped off from the dispersed solvent, which is saturated with monovinylacetylene, by introducing an excess of acetylene gas thereinto; and wherein pure monovinylacetylene is recovered from the issuing gas mixture. The improved process comprises more particularly concentrating the catalyst solution by evaporating water therefrom and dissolving additional copper(I) chloride in the catalyst solution so concentrated.

4 Claims, No Drawings

PRODUCTION OF MONOVINYLACETYLENE

U.S. Pat. No. 3,806,554 inter alia describes a process for making monovinylacetylene, wherein acetylene is introduced at temperatures within the range 40° and 100°C and under acetylene gas pressures within the range 0.01 and 10 atmospheres gauge into a Nieuwland catalyst type solution being an aqueous copper (I) chloride solution in hydrochloric acid, which is used in admixture with between 0.1 and 10 weight% of an alkali metal salt of an aminocarboxylic acid or of an aminosulfonic acid, which process comprises using the catalyst solution in further admixture with an organic monovinylacetylene-solvent boiling at temperatures higher than about 150°C, immiscible with the solution and containing at least 40 weight% of indan together with further mononuclear aromates; mechanically dispersing the catalyst solution and the solvent by introducing acetylene thereinto with the resultant formation of a homogeneous catalyst liquid having between 25 and 85 % by volume of the solvent therein; continually stripping off monovinylacetylene from the dispersed solvent, which is saturated with monovinylacetylene, by introducing an excess of acetylene gas thereinto; and recovering pure monovinylacetylene from the issuing gas mixture.

We have now unexpectedly found that it is possible to even further and considerably improve the acetylene conversion rates, for substantially unchanged monovinylacetylene yields, based on the acetylene transformed, by modifying or improving the process described in U.S. Pat. No. 3,806,554, the modification or improvement comprising concentrating the catalyst solution by evaporating water therefrom and dissolving additional copper(I) chloride in the catalyst solution so concentrated.

Further preferred features of the present process provide:
a. for additional copper(I) chloride to be dissolved in the concentrated catalyst solution until it is saturated therewith;
b. for the catalyst solution to be concentrated in the reaction zone by evaporating the water therefrom by the introduction of acetylene;
c. for a density within the range 1.85 and 2.5 kg/l, preferably within the range 1.9 and 2.1 kg/l, to be established in the catalyst solution; and
d. for a molar ratio of copper(I) chloride to alkali metal chloride or ammonium chloride complex former within the range 1.1 : 1.0 and 1.5 : 1.0, preferably within the range about 1.3 : 1.0, to be established in the catalyst solution.

The alkali metal salt of aminocarboxylic acid or aminosulfonic acid should preferably be selected from those of nitrilotriacetic acid, ethylenediaminotetracetic acid, ortho-, meta- or para-aminobenzoic acid, taurine, gylcine, α- or β-alanine.

The monovinylacetylene solvent, which is preferably used in the catalyst solution, is a coke plant-product having approximately the following composition, in weight%:

| | |
|---|---|
| Xylenes: | 1 – 2 |
| Cumene: | 2 – 5 |
| Mesitylene: | 5 – 15 |
| Pseudocumene: | 10 – 20 |
| Indan: | 40 – 80 |
| Tetralin: | 5 – 15 |

This is a commercially available product marketed under the designation of "Arsol" by ARAL company. The catalyst liquid should preferably contain between 30 and 60 % by volume of said solvent.

Nieuwland catalyst solutions having a density within the range 1.3 and 1.8 kg/l, preferably within the range 1.5 and 1.6 kg/l, more preferably 1.58 kg/l, are normally used in the art for making monovinylacetylene. Lower densities effect the decomposition of the catalytically active copper complex, whereas higher densities impair both the conversion rate and monovinylacetylene yield, based on the acetylene transformed (cf. comparative Example 2 hereinafter). This is the reason why catalyst solutions which have a density of 1.58 kg/l and are approximately composed of 34.5 weight% of CuCl, 24.5 weight% of KCl, 0.1 weight% of HCl and 40.9 weight% of $H_2O$, are preferred in industry.

A catalyst having the composition just indicated contains CuCl and KCl in a molar ratio of 1.05 : 1.00 (cf. comparative Example 1 hereinafter).

This prior art catalyst can be activated in accordance with the present invention by the following steps:

I. Preparation of a catalyst solution of high density

The simplest way of achieving this comprises concentrating the above Nieuwland catalyst containing CuCl and KCl in a molar ratio of 1.05 : 1.00, preferably in the reactor itself. To this end, it is advantageous for the water expelled from the catalyst solution under the reaction conditions by means of acetylene, which is passed therethrough, to be left unsubstituted until the solution has the desirable density. Needless to say, the density and composition of the catalyst solution are changed thereby. For example, a catalyst solution having a density of 1.90 kg/l is composed of 37.5 weight% of CuCl, 27.5 weight% of KCl, 0.2 weight% of HCl and 34.8 weight% of $H_2O$.

The initial 1.05 : 1.00 molar ratio of CuCl : KCl remains unaffected.

A catalyst solution merely concentrated is, however, not very suitable for use in making monovinylacetylene under standard reaction conditions, as it impairs the acetylene conversion rates and monovinylacetylene yields, based on the acetylene transformed (cf. comparative Example 2 hereinafter).

II. Increasing the CuCl : KCl-ratio in the catalyst solution

As has unexpectedly been found, it is possible for considerable additional quantities of CuCl to be dissolved in a concentrated catalyst solution, i.e., in a solution containing less water than initially. The Nieuwland catalyst with a density of 1.58 kg/l, which is normally used in industry, is saturated with CuCl, for a molar ratio of CuCl : KCl equal to 1.05 : 1.00. On the other hand, however, about a further 170 g CuCl/l is absorbed at 80°C by a concentrated catalyst solution having a density of 1.90 kg/l.

The unexpected result that additional copper(I) chloride can be dissolved in a concentrated catalyst solution without any need to add more complex former thereto, makes it possible for the CuCl: KCl-ratio in the catalyst solution to be increased. In the present case, the CuCl: KCl-ratio is increased from initially 1.05 : 1.00 to 1.30 : 1.00. A catalyst so concentrated and charged with additional CuCl has a particularly good activity which ensures high acetylene conversion rates. Even if so modified, it is, however, necessary for the catalyst solution, which enables high acetylene conversion rates to be obtained at the price of reduced monovinylacetylene yields, to be further treated so as to be suitable for use in the commercial production of monovinylacetylene (cf. comparative Example 3 hereinafter).

Only if the steps of the present invention are combined with the addition to the catalyst solution of an alkali metal salt of an aminocarboxylic acid or an aminosulfonic acid as described in U.S. Pat. No. 3,806,554, is it possible to produce the technically beneficial results of the present invention, in which it compares so favorably with the method described in comparative Example 1. The present invention enables more particularly the acetylene conversion rate to be considerably increased, for slightly diminished monovinylacetylene yields (cf. comparative Example 4).

To ensure optimum working conditions, it is necessary for the two steps of the present invention to be combined with a further modification of the process described in U.S. Pat. No. 3,806,554, namely for the catalyst solution to be used in further admixture with an organic monovinylacetylene solvent boiling at temperatures higher than about 150°C and being immiscible therewith.

It this is done, it is possible for the acetylene conversion rate to be increased considerably from about 17 – 18 % to more than 25 %, for substantially unchanged monovinylacetylene yields of more than 91 %, based on the acetylene transformed.

It is therefore good practice to produce monovinylacetylene with the use of a catalyst prepared in the specific manner disclosed in U.S. Pat. No. 3,806,554 and activated in accordance with the present invention.

The statements made in U.S. Pat. No. 3,806,554 are incidentally also true concerning the present invention.

The following Examples illustrate the invention.

EXAMPLES 1 to 6

A jacketed reactor 1.5 m high with an internal diameter of 5 cm was fed in each particular case with 5 l of catalyst solution. The catalyst solution was heated to 80°C and 600 l/hr of acetylene was introduced thereinto, through the bottom portion of the reactor.

The following reaction conditions were maintained constant in all of the Examples:

| Reaction temperature: | 80°C |
| Gas pressure at reactor inlet: | 0.2 atm. gauge |
| Gas load: | 120 l acetylene/l catalyst. |

The gas coming from the reactor was subjected to gaschromatography and the results obtained were used to identify the acetylene conversion rate and monovinylacetylene yield.

Comparative Example 1 illustrates the behaviour of a prior art Nieuwland catalyst.

Comparative Examples 2 to 4 illustrate preliminary treatment steps taken in accordance with this invention and Examples 5 and 6 illustrate the complete process of the present invention.

The composition and density of the various catalysts are indicated in Table 1 and the results obtained therewith are indicated in Table 2.

Table 1:

| Ex. | Catalyst composition, wgt% | | | | Molar ratio CuCl:KCl | Density at 80°C (kg/l) | Catalyst addition | Catalyst addition |
| --- | --- | --- | --- | --- | --- | --- | --- | --- |
| | CuCl | KCl | HCl | H$_2$O | | | | |
| 1 | 34.5 | 24.5 | 0.1 | 40.9 | 1.05:1.00 | 1.58 | — | — |
| 2 | 37.5 | 27.5 | 0.2 | 34.8 | 1.05:1.00 | 1.90 | — | — |
| 3 | 42.7 | 25.1 | 0.2 | 32.0 | 1.30:1.00 | 2.06 | — | — |
| 4 | 42.7 | 25.1 | 0.2 | 32.0 | 1.30:1.00 | 2.06 | 2 wgt% NTE-salt | — |
| 5 | 42.7 | 25.1 | 0.2 | 32.0 | 1.30:1.00 | 2.06 | 2 wgt% NTE-salt | 3,5 l catalyst solution 1,5 l "Arsol" |
| 6 | 42.5 | 24.9 | 0.2 | 33.4 | 1.30:1.00 | 2.00 | 2 wgt% NTE-salt | 3,5 l catalyst solution 1,5 l "Arsol" |

NTE-salt = Sodium salt of nitrilotriacetic acid
"Arsol" has the following composition in wgt%: Indan : 61.0; xylenes : 1.5; cumene : 2.5; mesitylene : 11.5; pseudocumene : 16.5; tetralin : 7.0.
Boiling range: 160–205°C.

Table 2:

| Example | 1 | 2 | 3 | 4 | 5 | 6 |
| --- | --- | --- | --- | --- | --- | --- |
| Acetylene conversion (%) | 17.5 | 16.8 | 25.3 | 24.7 | 25.4 | 24.2 |
| Monovinylacetylene yield, based on acetylene transformed (%)* | 77.5 | 73.8 | 65.6 | 75.5 | 91.2 | 93.5 |
| Monovinylacetylene concentration in reaction-gas (% by volume) | 6.8 | 6.4 | 9.6 | 10.1 | 10.8 | 11.3 |

*The by-products obtained are: Vinyl chloride, acetaldehyde, divinylacetylene, methylvinylketone, chloroprene and polymers.

We claim:

1. In a process for making monovinylacetylene, wherein acetylene is introduced at temperatures within the range 40° and 100°C and under acetylene gas pressures within the range 0.01 and 10 atmospheres (gauge) into a Nieuwland catalyst type solution being an aqueous copper(I) chloride solution in hydrochloric acid, which is used in admixture with between 0.1 and 10 weight% of an alkali metal salt of an aminocarboxylic acid or of an aminosulfonic acid and in further admixture with an organic monovinylacetylene solvent boiling at temperatures higher than about 150°C, immiscible with the solution and containing at least 40 weight% of indan together with further mononuclear aromates; wherein the catalyst solution and the solvent are mechanically dispersed by introducing acetylene thereinto with the resultant formation of a homogeneous catalyst liquid having between 25 and 85 % by volume of the solvent therein; wherein monovinylacetylene is continually stripped off from the dispersed solvent, which is saturated with monovinylacetylene, by introducing an excess of acetylene gas thereinto and wherein pure monovinylacetylene is recovered from the issuing gas mixture the improvement which comprises, concentrating the catalyst solution by evaporating water therefrom and dissolving additional copper(I) chloride in the catalyst solution so concentrated thereby establishing a molar ratio of Copper(I) Chloride to Alkali metal chloride or ammonium chloride complex former within the range 1.1 : 1.0 and 1.5 : 1.0 in the catalyst solution.

2. A process as claimed in claim 1, wherein additional copper(I) chloride is dissolved in the concentrated catalyst solution until it is saturated therewith.

3. A process as claimed in claim 1, wherein the catalyst solution is concentrated in the reaction zone itself by evaporating water therefrom by the introduction of acetylene.

4. A process as claimed in claim 1, wherein a density within the range 1.85 and 2.5 kg/l is established in the catalyst solution.

* * * * *